US007382742B2

(12) United States Patent
Ohta et al.

(10) Patent No.: US 7,382,742 B2
(45) Date of Patent: Jun. 3, 2008

(54) COMMUNICATION SYSTEM, INFORMATION COLLECTING SYSTEM AND METHOD THEREFOR

(75) Inventors: Takayuki Ohta, Yokohama (JP); Tetsuya Nakayama, Yokohama (JP)

(73) Assignee: Allied Telesis K.K., Tokyo (JP)

( * ) Notice: Subject to any disclaimer, the term of this patent is extended or adjusted under 35 U.S.C. 154(b) by 1028 days.

(21) Appl. No.: 10/689,210

(22) Filed: Oct. 21, 2003

(65) Prior Publication Data

US 2005/0009575 A1 Jan. 13, 2005

(30) Foreign Application Priority Data

Jul. 9, 2003 (JP) ............................. 2003-194000

(51) Int. Cl.
*H04Q 7/20* (2006.01)
(52) U.S. Cl. .................. 370/310; 370/310.1; 370/338; 455/517
(58) Field of Classification Search ................ 370/310, 370/310.1, 310.2, 328, 338, 329, 341, 346, 370/231, 235; 455/403, 404.1, 410, 411, 455/412.1, 415, 432.3, 560, 422.1, 445, 414.1, 455/456.1, 457, 567, 517
See application file for complete search history.

(56) References Cited

U.S. PATENT DOCUMENTS

| 5,327,144 | A | * | 7/1994 | Stilp et al. ................... 342/387 |
| 5,586,167 | A | * | 12/1996 | Handforth ................. 455/456.2 |
| 5,724,346 | A | * | 3/1998 | Kobayashi et al. ......... 370/329 |
| 5,761,195 | A | * | 6/1998 | Lu et al. ...................... 370/329 |
| 6,292,747 | B1 | * | 9/2001 | Amro et al. ................. 701/213 |
| 6,714,791 | B2 | * | 3/2004 | Friedman ................. 455/456.1 |
| 6,907,255 | B2 | * | 6/2005 | Kawamoto ............... 455/456.5 |
| 6,922,634 | B2 | * | 7/2005 | Odakura et al. ............ 701/211 |
| 7,099,774 | B2 | * | 8/2006 | King et al. ................. 701/213 |
| 2002/0168958 | A1 | * | 11/2002 | Ford et al. .................. 455/404 |
| 2003/0120801 | A1 | * | 6/2003 | Keever et al. ............. 709/237 |
| 2004/0230370 | A1 | * | 11/2004 | Tzamaloukas .............. 701/200 |

FOREIGN PATENT DOCUMENTS

| JP | A 10-117207 | 5/1998 |
| JP | A 10-322262 | 12/1998 |
| JP | A 11-41667 | 2/1999 |
| JP | A 2000-307660 | 11/2000 |
| JP | A 2000-354049 | 12/2000 |
| JP | A 2002-236632 | 8/2002 |
| JP | A 2003-46680 | 2/2003 |

\* cited by examiner

*Primary Examiner*—Jean Gelin
(74) *Attorney, Agent, or Firm*—Steven J. Hultquist; Intellectual Property/Technology Law

(57) ABSTRACT

Interconnect of communication between mobile objects by another mobile object is enabled. Station A transmits its own identifier to another mobile station on a broadcast basis. Out of other mobile stations, Station B receives the identifier of Station A, and returns a response including its own identifier. Station A notifies Station B of identifiers of nodes with which it can communicate. Station B notifies Station A of identifiers of nodes with which it can communicate. This sequence of processing enables information on nodes with which either station can communicate to be exchanged between Stations A and B, and a communication path to nodes to be found between Station B (station A) and another node via Station A (station B).

3 Claims, 16 Drawing Sheets

VEHICLE MANAGEMENT DEVICE 2,
VEHICLE-MOUNTABLE WIRELESS ACCESS POINT 304

| TRANSMISSION DESTINATION ID | ADDRESS ID | TRANSMISSION SOURCE ID | SIGNAL TYPE | DATA PA SE |
| --- | --- | --- | --- | --- |

S10

MOBILE STATION
PROGRAM 34

S14

COMMUNICATION SYSTEM, INFORMATION COLLECTING SYSTEM AND METHOD THEREFOR

BACKGROUND OF THE INVENTION

1. Field of the Invention

The present invention relates to a communication system suitable for direct communication by one mobile object with another and for communication by one mobile object with another interconnected by still another mobile object and a method therefor.

2. Description of the Related Art

Patent References 1 through 7, for instance, disclose methods for connecting a mobile object to a network, such as a LAN, to carry out data communication. Non-Patent Reference 1 discloses a method for connecting mobile objects with wireless access points to carry out data communication. However, none of these references discloses a method that dynamically searches for and finds a communication path between a plurality of mobile objects to make possible communication between them.

Patent Reference 1: Japanese Published Unexamined Patent Application No. 2002-236632

Patent Reference 2: Japanese Published Unexamined Patent Application No. 2003-46680

Patent Reference 3: Japanese Published Unexamined Patent Application No. 2000-354049

Patent Reference 4: Japanese Published Unexamined Patent Application No. 2000-307660

Patent Reference 5: Japanese Published Unexamined Patent Application No. H11-41667

Patent Reference 6: Japanese Published Unexamined Patent Application No. H10-322262

Patent Reference 7: Japanese Published Unexamined Patent Application No. H10-117207

Patent Reference 6: Japanese Published Unexamined Patent Application No. H11-41667

Patent Reference 7: Japanese Published Unexamined Patent Application No. H10-322262

Patent Reference 8: Japanese Published Unexamined Patent Application No. H10-117207

Non-Patent Reference 1: Architecture of an Internet Environment Involving Motor Vehicles (1997 WIDE Report)

The present invention, attempted in view of the problems noted above with respect to the prior art, is intended to provide a communication system capable of constantly searching and finding the optimal communication path between a plurality of communication nodes and carrying out communication between them, and a method therefor. Another object of the invention is to provide a communication system for not only carrying out direct communication between mobile objects but also enabling another mobile object to interconnecting communication between them, and a method therefor. Still another object of the invention is to provide a communication system for not only carrying out direct communication between a mobile object and a network but also enabling another mobile object to interconnecting communication between them, and a method therefor. Yet another object of the invention is to provide an information collecting apparatus capable of constantly searching and finding the optimal communication path between a plurality of communication nodes and collecting information, and a method therefor.

SUMMARY OF THE INVENTION

[Communication System]

In order to achieve the objects stated above, a communication system according to the present invention is provided with a network and one or more communication devices each communicating with the network and other communication devices or any of them, wherein the network has wireless access points for use in connection to the communication devices, and each of the plurality of communication devices has communication device notifying means for notifying each of the communication devices, which are informed of an identifier, of communication devices with which the particular communication device can communicate, communication path-searching means for searching for a communication path to and from communication devices with which it can communicate on the basis of the notified communication devices, and communicating means for carrying out, on the basis of the communication path acquired as a result of the search, communication with the network via the wireless access points and/or communication with another communication device.

[Communication Device]

In a communication device for communication by one communication device with other communication devices according to the invention, each of the plurality of communication devices has communication device notifying means for notifying each of the communication devices, which are informed of an identifier, of communication devices with which it can communicate, communication path-searching means for searching for a communication path to and from communication devices with which the particular communication device can communicate on the basis of the notified communication devices, and communicating means for carrying out, on the basis of the communication path acquired as a result of the search, communication with another communication device.

Preferably, one or more of the plurality of communication devices should be vehicle-mountable wireless access points.

Preferably, the communication path-searching means should search for a communication path which, as the communication path, should link the communication device with which the first mentioned communication device can communicate and the particular communication device via the communication device.

And preferably, the communication path-searching means should search for a communication path which, as the communication path, minimizes the number of the communication devices between the communication device with which the first mentioned communication device can communicate and the particular communication device.

It is also preferable that each of the communication devices bears an intrinsic identifier, and each of the plurality of communication devices further has identifier informing means for informing each of the other communication devices of its own identifier, the communication device notifying means notify the identifier of the particular communication device and the identifiers of the communication devices with which it can communicate to each of the communication devices informed of the identifier, the communication path-searching means search, on the basis of the informed identifier, for a communication path between the communication devices with which the particular communication device can communicate and itself, the communicating means have receiver means for receiving from the other communication devices communication data including the identifiers of the communication devices that are their communication partners, communication data processing means for processing the received communication data if the identifier contained in the received communication data is the identifier of the particular communication device, and communication data interconnecting means for interconnecting, on the basis of the communication path, the received communication data to the communication device that is the communication partner or to a communication device intervening between the communication partner and the particular communication device if the identifier contained in the received communication data is not the identifier of the particular communication device.

Preferably, the notification of the communication devices with which the particular communication device can communicate and the search for the communication path should be repeated at prescribed intervals of time.

[Communication Method]

By a communication method for carrying out communication between one communication device and other communication devices according to the invention, whereby each of the communication devices notifies each of the other communication devices, which are informed of an identifier, of communication devices with which it can communicate, a communication path between the communication devices with which the particular communication device can communicate with and itself is searched for on the basis of the notified communication devices, and communication is carried out, on the basis of the communication path acquired as a result of the search, with the other communication devices.

[First Program]

A first program for carrying out communication between one communication device and other communication devices according to the invention causes a computer to execute, in each of the communication devices, a step of notifying each of the communication devices, which are informed of an identifier, of communication devices with which the particular communication device can communicate, a step of searching for a communication path to and from communication devices with which the particular communication device can communicate on the basis of the notified communication devices, and a step of carrying out communication, on the basis of the communication path acquired as a result of the search, with the other communication devices.

[Information Collecting System]

In an information collecting system according to the invention connected to one or more mobile object communication devices via the mobile object communication device and a network and having an information collecting apparatus for collecting information from each of the mobile object communication devices, the information collecting apparatus has communication path-searching means for a communication path between the mobile object communication devices, and information collecting means for collecting from each of the mobile object communication devices by use of the searched-for communication path.

Preferably, one or more of the mobile object communication devices should be vehicle-mountable communication devices.

Preferably, the mobile object communication devices should be provided with wireless access points and the mobile object communication devices should be connected to the information collecting apparatus via the wireless access points.

Preferably, each of the mobile object communication devices should have wireless communicating means for communicating with the wireless access points or the other mobile object communication devices by wireless communication, and interconnecting/communicating means for interconnecting communication between the other mobile object communication devices and the wireless access points.

Preferably, each of the mobile object communication devices should further have communication path-searching means for searching for a communication path to and from each of the other mobile object communication devices.

[Information Collecting Apparatus]

An information collecting apparatus according to the invention for collecting information from each of one or more communication nodes is provided with communication path-searching means for searching a communication path between the communication nodes and information collecting means for collecting information from each of the communication nodes by use of the searched-for communication path.

Preferably, the communication path-searching means should search for a communication path which, as the communication path, should link the communication nodes with which a given node can communicate with the particular node via the communication nodes.

Preferably, the communication path-searching means should search for a communication path which, as the communication path, minimizes the number of the communication nodes between the communication device with which a given communication node can communicate and the particular communication node.

Preferably, the information collecting apparatus and each of the communication nodes respectively should bear intrinsic identifiers, the information collecting apparatus further have identifier informing means for informing each of the other communication nodes of its own identifier, and each of the communication nodes should notify communication nodes with which it can communicate to the information collecting apparatus or any of the communication nodes informed of the identifier, search for a communication path, on the basis of the notified communication nodes, between the communication nodes with which it can communicate and itself, and carry out communication with the other communication devices on the basis of the communication path acquired as a result of the search.

Preferably, each of the communication nodes informs its own identifier and the identifiers of the communication nodes with which it can communicate to the information collecting apparatus or each of the communication nodes informed of the identifier, and the communication path-searching means searches for a communication path between the communication nodes with which it can communicate and itself on the basis of the informed identifier.

And preferably, any of the communication nodes should interconnect, on the basis of the communication path, received communication data to the information collecting apparatus that is its communication partner or to a communication node intervening between the information collecting apparatus, which is the communication partner, and the particular communication node if the identifier contained in the received communication data is not the identifier of the particular communication node.

[Information Collecting Method]

By an information collecting method according to the invention for collecting information from each of one or more communication nodes, a communication path between the communication nodes is searched for and, by use of the searched-for communication path, information is collected from each of the communication nodes.

[Second Program]

By a second program according to the invention for collecting information from each of one or more communication nodes, a computer is caused to execute a step of searching for a communication path between the communication nodes and a step of collecting information from each of the communication nodes by use of the searched-for communication path.

DETAILED DESCRIPTION OF THE PREFERRED EMBODIMENT

[Mobile Object Communication System 1]

Figure 1:
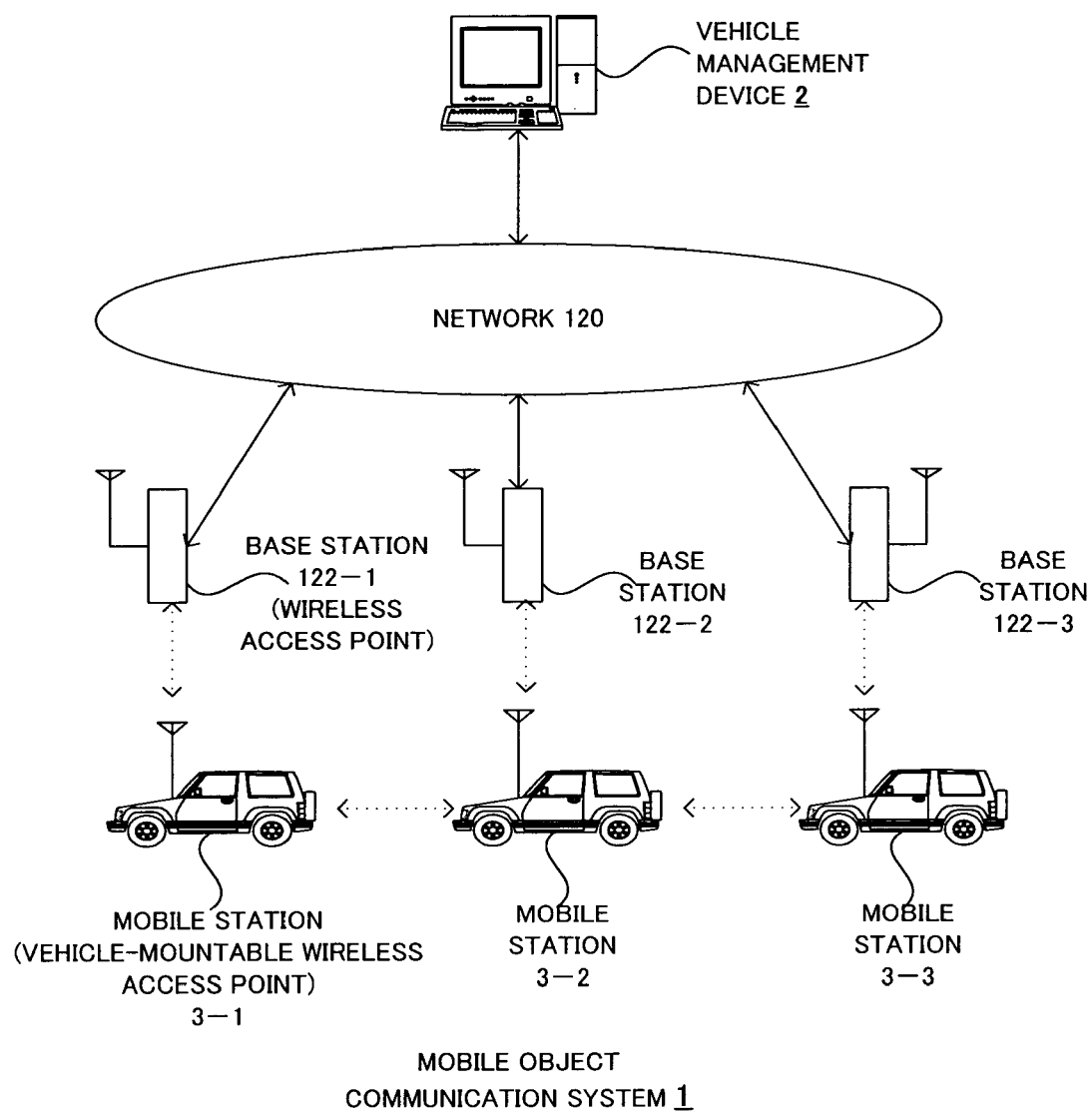
FIG. 1 illustrates an example of configuration of a mobile object communication system according to the present invention.

referred embodiments of the present invention are described below. FIG. 1 illustrates an example configuration of a mobile object communication system 1 according to the invention. As shown in FIG. 1, the mobile object communication system 1 is configured by connecting base stations 122-1 through 122-3 and a vehicle management device 2 by a network 120, which may be the Internet, a LAN or a WAN, and connecting mobile stations (vehicle-mountable access points) 3-1 through 3-3 to the network 120 by the base stations 122. In the following description, when a plurality of constituent parts, such as the base stations 122-1 through 122-3, are to be mentioned without specifying anyone or more of them, they may be referred to in an abbreviated expression, such as the base stations 122.

Further in the following description, the vehicle management device 2, the base stations 122 and the mobile stations 3 may be generically referred to as "communication nodes" or "stations," and an intrinsic identifier (ID) to be used as the address in communication, such as a MAC address, will be attached to each communication node. The mobile stations 3 move mounted on vehicles or the like, and are connected to each other by vehicle-mountable wireless access points. The base stations 122 connect the mobile stations 3 to the network 120, and exchange data with them.

[Communication Path in Mobile Object Communication System 1]

FIG. 2 through FIG. 5 are first through fourth drawings illustrating examples of the communication path in the mobile object communication system 1 shown in FIG. 1. In the mobile object communication system 1, these constituent parts enable the vehicle management device 2 and the mobile stations 3 to be interconnected and connected by a communication path set via the base stations 122 and the network 120 as indicated by a broken line in FIG. 2, and communication to take place between them. Or in the mobile object communication system 1, mobile stations 3 may be directly connected to each other by a communication path set between them as indicated by a broken line in FIG. 3, and communication to take place between them. Or in the mobile object communication system 1, mobile stations 3 may be connected to each other by a communication path set via another mobile station 3 as indicated by broken lines in FIG. 4, and communication to take place between them. Or the vehicle management device 2 and a mobile station 3 may be connected to each other by a communication path set via another mobile station 3, a base station 122 and the network 120 as indicated by broken lines in FIG. 5, and communication to take place between them.

[Hardware Configuration]

Figure 6:
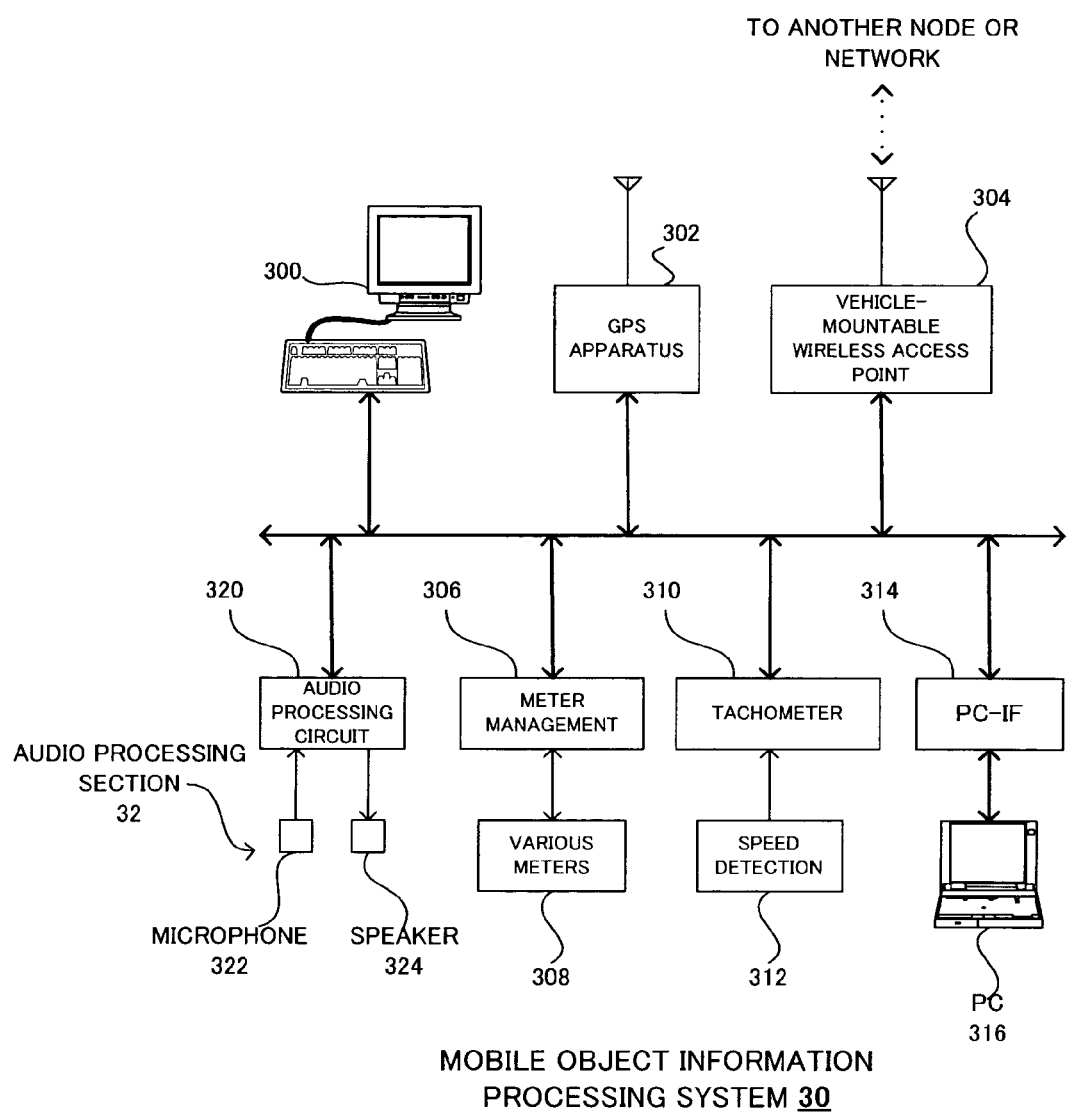
FIG. 6 illustrates an example configuration of the mobile object information processing system of the mobile station shown in FIG. 1.

FIG. 6 illustrates an example of configuration of the mobile object information processing system 30 of the mobile station 3 shown in FIG. 1. The mobile object information processing system 30 is mounted on a vehicle (mobile object) and moves. As shown in FIG. 6, the mobile object information processing system 30 comprises an operation console 300 having a display device and input keys among other elements, a GPS apparatus 302, a vehicle-mountable wireless access point 304, a meter management device 306, a tachometer 310, a PC interface (PC-IF) 314 and an audio processing apparatus 320, all connected by a bus.

In the mobile object information processing system 30, the operation console 300 displays information to the user and accepts information as operated by the use. The GPS apparatus 302, which may be a car navigation apparatus for instance, finds the position of the mobile station 3 by the Global Positioning System (GPS). The vehicle-mountable wireless access point 304 has a hardware configuration to be described below with reference to FIG. 7, executes a mobile station program 34 to be described below with reference to FIG. 9, searches for a communication path as illustrated in any of FIG. 2 through FIG. 5, transmits information from the mobile station 3, and processes communication between communication nodes over a wireless LAN.

The meter management device 306 manages various meters of the vehicle and picks up the readings of these meters. A tachometer 310 records the traveling distance of the vehicle over time on the basis of the speed detected by a speed detecting apparatus 312. The PC-IF 314 interfaces between the mobile object information processing system 30 and a personal computer (PC) 316. The audio processing apparatus 320 comprises a microphone 322, a loudspeaker 324 and the audio processing circuit 320 among other items. The audio processing apparatus 320 subjects to analog-to-digital (A/D) conversion audio signals entered from the microphone 322, and supplies the converted signals to the vehicle-mountable wireless access point 304. The audio processing apparatus 320 also subjects to digital-to-analog (D/A) conversion audio data entered from the vehicle-mountable wireless access point 304, and supplies the converted data from the loudspeaker 324.

Figure 7:
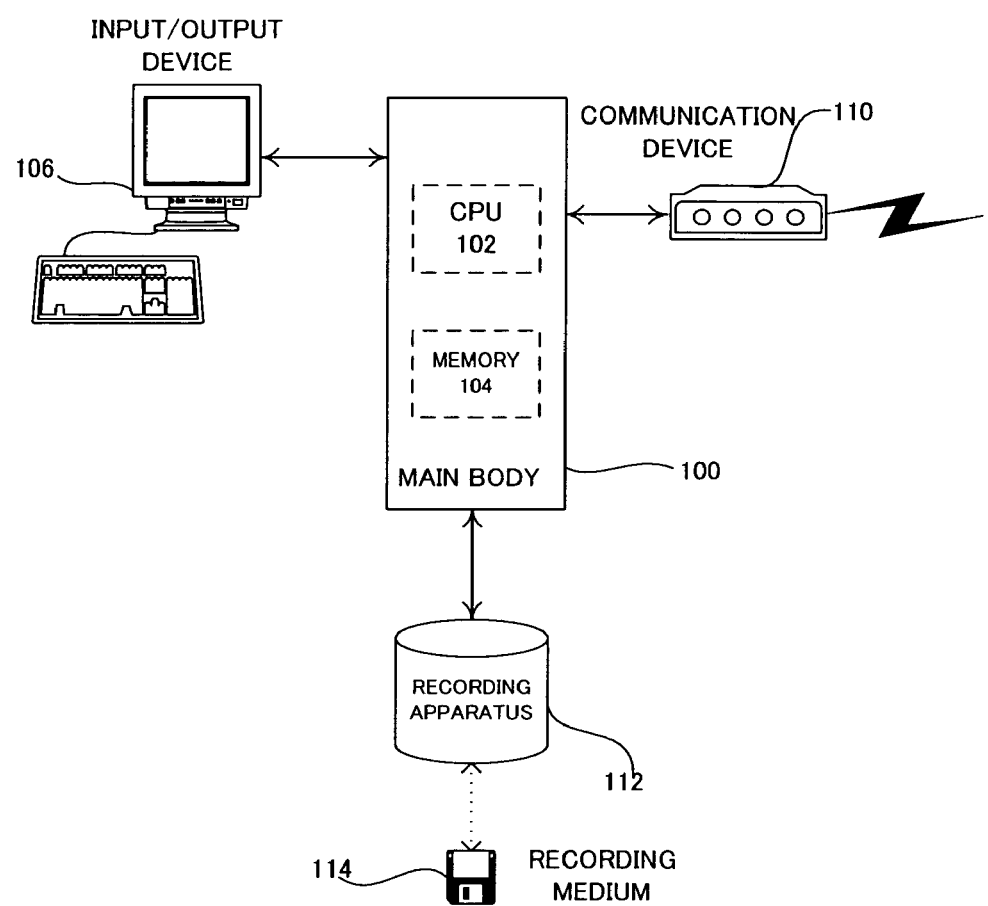
FIG. 7 illustrates an example hardware configuration of the vehicle management device shown in FIG. 1, and of the vehicle-mountable wireless access point of the mobile station shown in FIG. 7.

FIG. 7 illustrates an example hardware configuration of the vehicle management device 2 shown in FIG. 1, and of the vehicle-mountable wireless access point 304 of one of the mobile stations shown in FIG. 7. As shown in FIG. 7, the vehicle management device 2 and the vehicle-mountable wireless access point 304 are configured of a main body 100 including a CPU 102 and a memory 104, an input/output device 106 including a display device and a keyboard, a communication device 110 and a recording apparatus 112, which may be an HDD apparatus or a CD apparatus. Thus, the vehicle management device 2 has a constituent part serving as an ordinary computer capable of communicating with other communication nodes via the network 120. The vehicle-mountable wireless access point 304 also has a constituent part serving as an ordinary computer capable of communicating with the base stations 122 and the mobile stations 3 via wireless communication lines.

[Software Configuration]

Figures 8, 10:
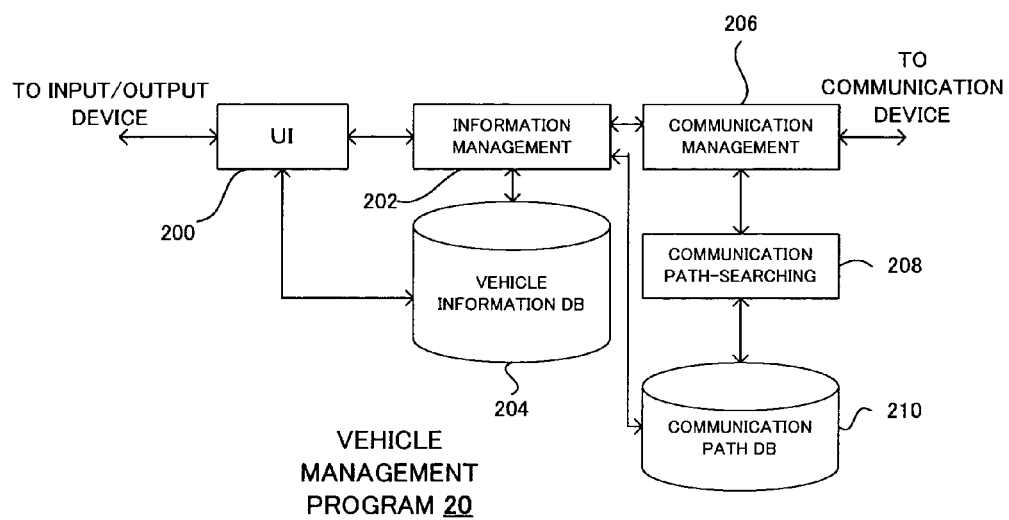
FIG. 8 illustrates an example configuration of the vehicle management program executed by the vehicle management device shown in FIG. 1 and FIG. 7.
FIG. 10 illustrates an example configuration of data used for communication between nodes in a mobile object communication system.

FIG. 8 illustrates an example configuration of a vehicle management program 20 executed by the vehicle management device 2 shown in FIG. 1 and FIG. 7. As shown in FIG. 8, the vehicle management program 20 is configured of a user interface (UI) section 200, an information management section 202, a vehicle information database (DB) 204, a communication control section 206, a communication path-searching section 208 and a communication path DB 210.

Figure 2:
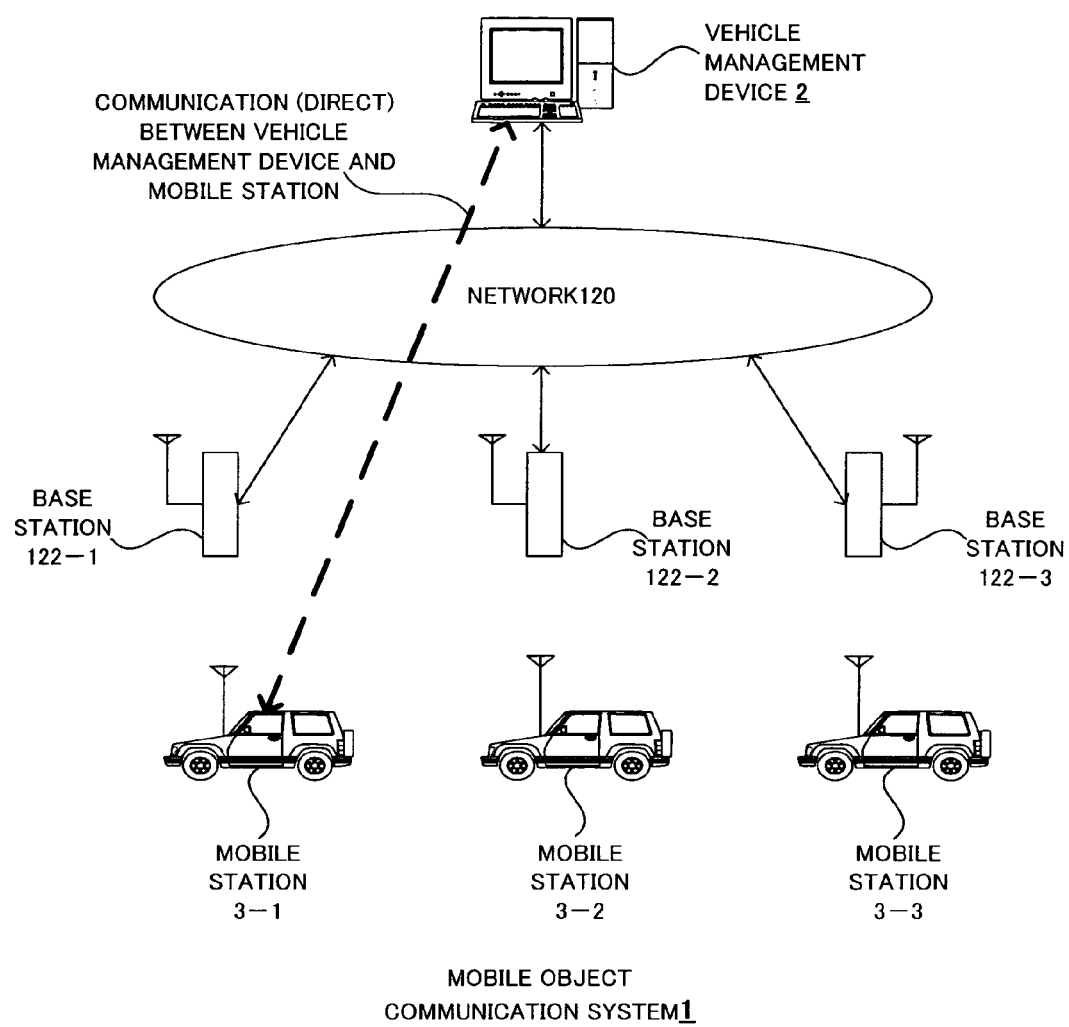
FIG. 2 is a first drawing illustrating an example communication path in the mobile object communication system shown in FIG. 1.
Figure 5:
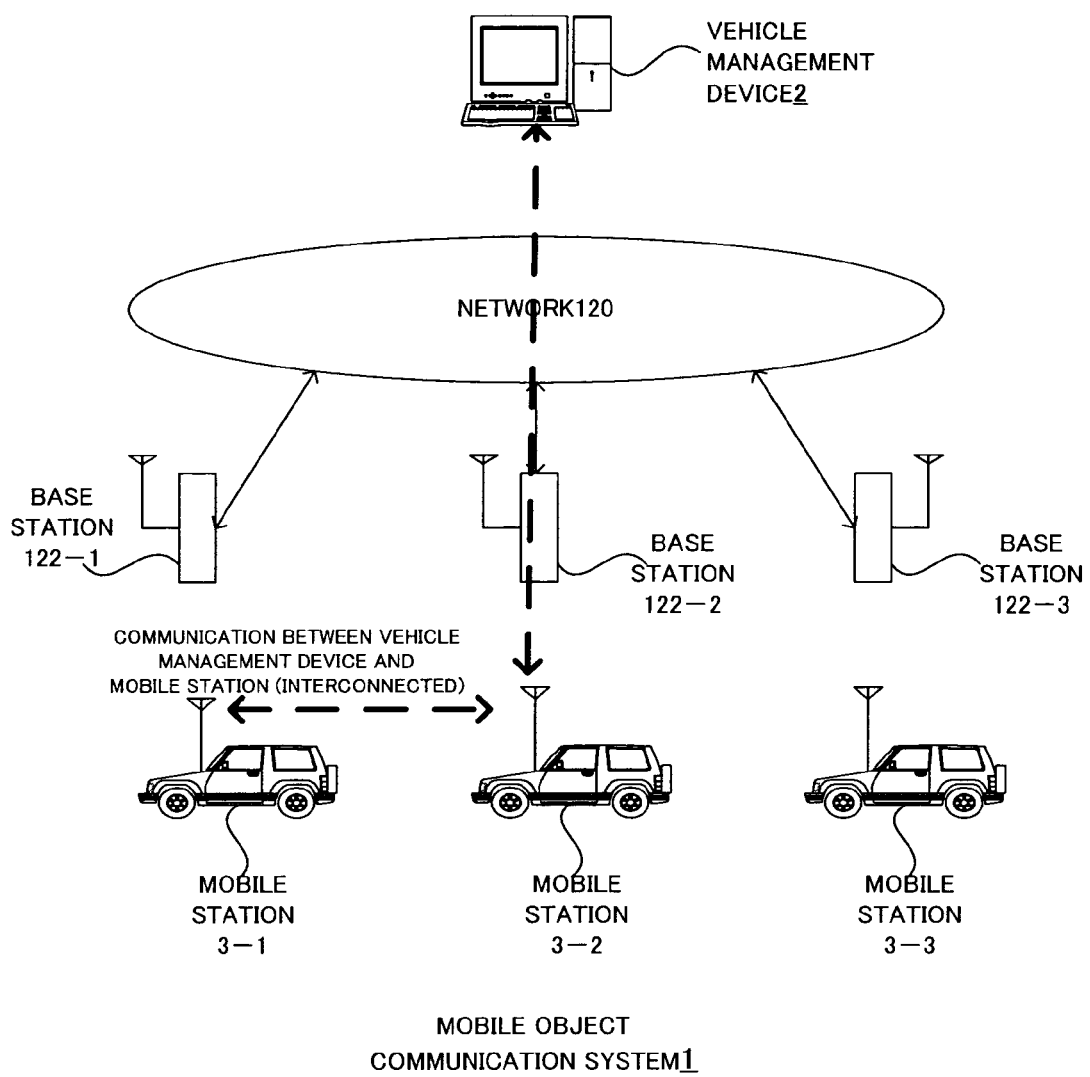
FIG. 5 is a fourth drawing illustrating an example communication path in the mobile object communication system shown in FIG. 1.

The vehicle management program 20 is supplied to the vehicle management device 2 via, for instance, a recording medium 114 (FIG. 7), and loaded into the memory 104 to be executed. The vehicle management program 20, with these constituent parts, searches for a communication path to each of the mobile stations 3 as shown in FIG. 2 and FIG. 5. The vehicle management program 20 also communicates with the mobile stations 3 via the communication paths acquired as a result of the search, collects various items of information (including positional information obtained by the GPS apparatus 302, readings of various meters obtained by a speed detecting apparatus 308 and contents recorded by the tachometer 310) from the mobile stations 3, stores and manages them.

In the vehicle management program 20, the UI section 200 accepts the user's operations on the input/output device 106 (FIG. 7), and controls processing by each constituent part of the vehicle management program 20. The UI section 200 displays on the input/output device 106 various items of information on the mobile stations 3 stored in the vehicle information DB 204.

The communication control section 206, following the communication paths stored in the communication path DB 210, carries out necessary controls for communication between the mobile stations 3. The information management section 202 receives various items of information from the mobile stations 3 via the communication control section 206, stores them in the vehicle information DB 204 and manages them. Also, the information management section 202, at the user's request, displays various items of information stored in the vehicle information DB 204.

Figure 9:
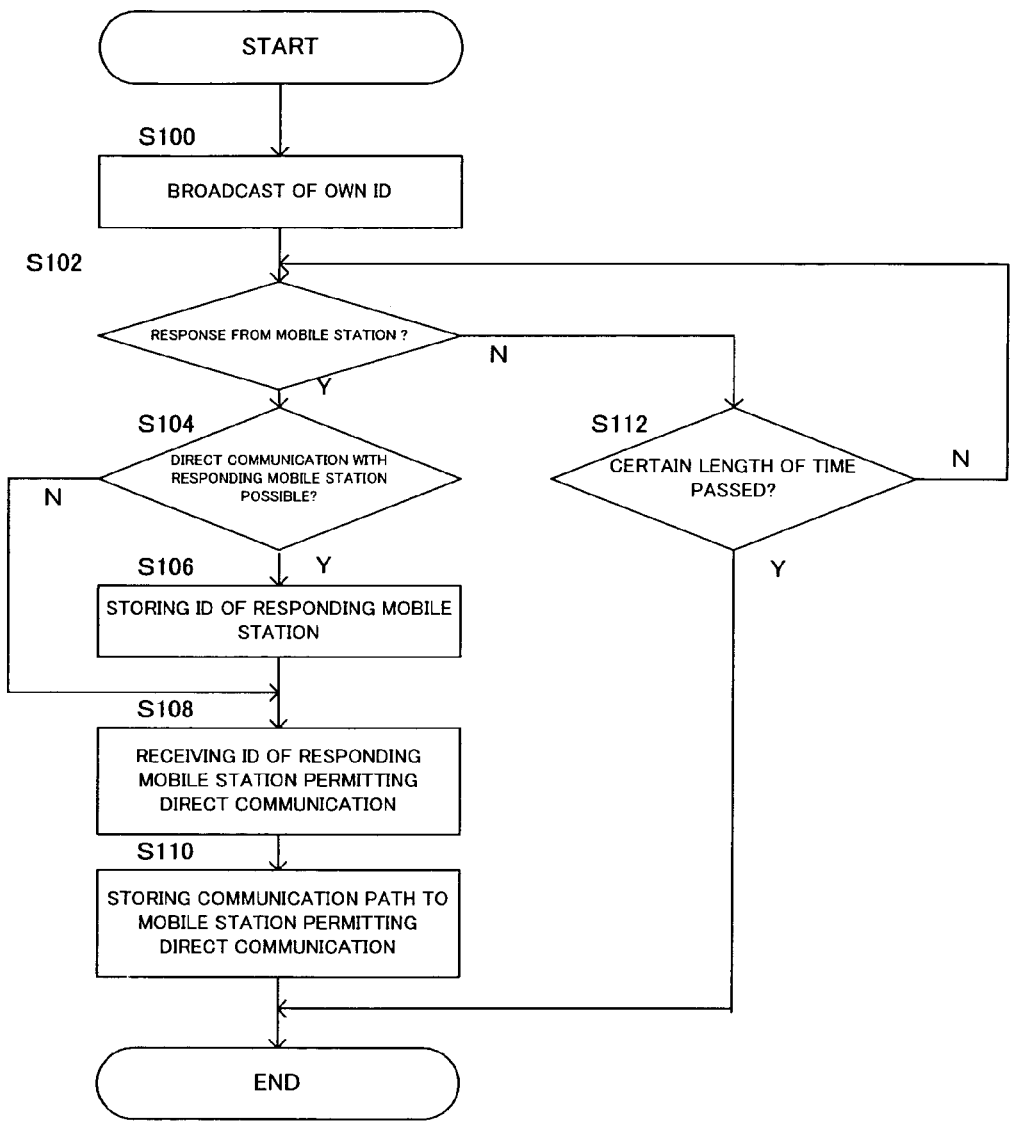
FIG. 9 is a flow chart showing the communication path search processing (S10) by the communication path-searching unit shown in FIG. 8.

FIG. 9 is a flowchart showing the communication path search processing (S10) by the communication path-searching unit 208 shown in FIG. 8. FIG. 10 illustrates an example configuration of data used for communication between nodes in the mobile object communication system 1. The communication path-searching section 208 searches for a communication path between it and each of the mobile stations 3, and stores found paths in the communication path DB 210.

The communication path search processing by the communication path-searching section 208 is described with reference to FIG. 9. For instance, the communication path-searching section 208 executes this communication path search processing at prescribed intervals of time, such as once every two hours. As shown in FIG. 9, at step 100 (S100), the communication path-searching section 208 transmits the identifier of the vehicle management device 2 (own station ID) on a broadcast basis to, the mobile stations 3 via the network 120 and the base stations 122.

For communication between the communication nodes of the mobile object communication system 1, a data format like the one illustrated in FIG. 10 is used. For instance in the processing of S100, addresses indicating broadcast transmission are stored in the data format shown in FIG. 10 as the transmission destination IDs, the identifier (ID) of the vehicle management device 2 is stored as the transmission source ID, and a command requesting each of the mobile stations 3 to return its identifier as the signal type.

At step 102 (S102), the communication path-searching section 208 determines via the base stations 122 and the network 120 whether a response has been received from any of the mobile stations 3. If there has been a response, the communication path-searching section 208 proceeds with the processing S104 or, if not, with the processing of S112.

At step 104 (S104), the communication path-searching section 208 determines whether or not it is possible to directly communicate with the responding mobile station 3 as shown in FIG. 2 without the intervention of another mobile station 3. The communication path-searching section 208, if it determines that direct communication is possible, proceeds with the processing S106 or, if not, with the processing of S108.

At step 106 (S106), the communication path-searching section 208 stores the identifier of the responding mobile station 3 in the communication path DB 210 as representing a mobile station 3 with which direct communication is possible. Then the responding mobile station 3 notifies the vehicle management device 2 of the identifiers of its own and of other mobile stations 3 with which either direct or interconnected communication (FIG. 3 and FIG. 4) is possible. Although it is also conceivable for the first mentioned mobile station 3 to return the identifiers only of other mobile stations 3 with which direct communication is possible, the following description concerns a case in which each of the mobile stations 3 transmits to the vehicle management device 2 the identifiers of other mobile stations 3 with which direct communication is possible and others with which interconnected communication is possible station 3.

At step 108 (S108), the communication path-searching section 208 receives the identifiers of the other mobile stations 3 with which direct communication is possible returned by the first mentioned responding mobile station 3. Of the processing steps S106 and S108, either may come first. At step 110 (S110), the communication path-searching section 208 stores in the communication path DB 210 the identifiers of the other mobile stations 3 received from the first mentioned responding mobile station 3 as the identifiers of the mobile stations 3 with which interconnected communication is possible via another responding mobile station 3.

It is also conceivable for the communication path-searching section 208 at S108 to limit the number of mobile stations 3 with which interconnected communication is possible, for instance, according to the number of communication nodes (mobile stations 3) intervening between the vehicle management device 2 and another mobile station 3 with which interconnected communication is possible via any responding mobile station 3, and to store the limited number of such mobile stations 3 in the communication path DB 210. Furthermore, at S108, the communication path-searching section 208 may, if a plurality of communication paths are available to a given mobile station 3, select the communication path that would minimize the distance between the vehicle management device 2 and the mobile station 3, or select only the communication path which would minimize the number of communication nodes intervening between the vehicle management device 2 and the mobile station 3 and store it in the communication path DB 210.

At step 112 (S112), the communication path-searching section 208, after transmitting on a broadcast basis the identifier ID of the vehicle management device 2 to the mobile station 3 by the processing of S100, determines whether a certain length of time has passed. The communication path-searching section 208, if it finds that the length of time has passed, completes processing or, if not, returns to the processing of s100.

Figure 3:
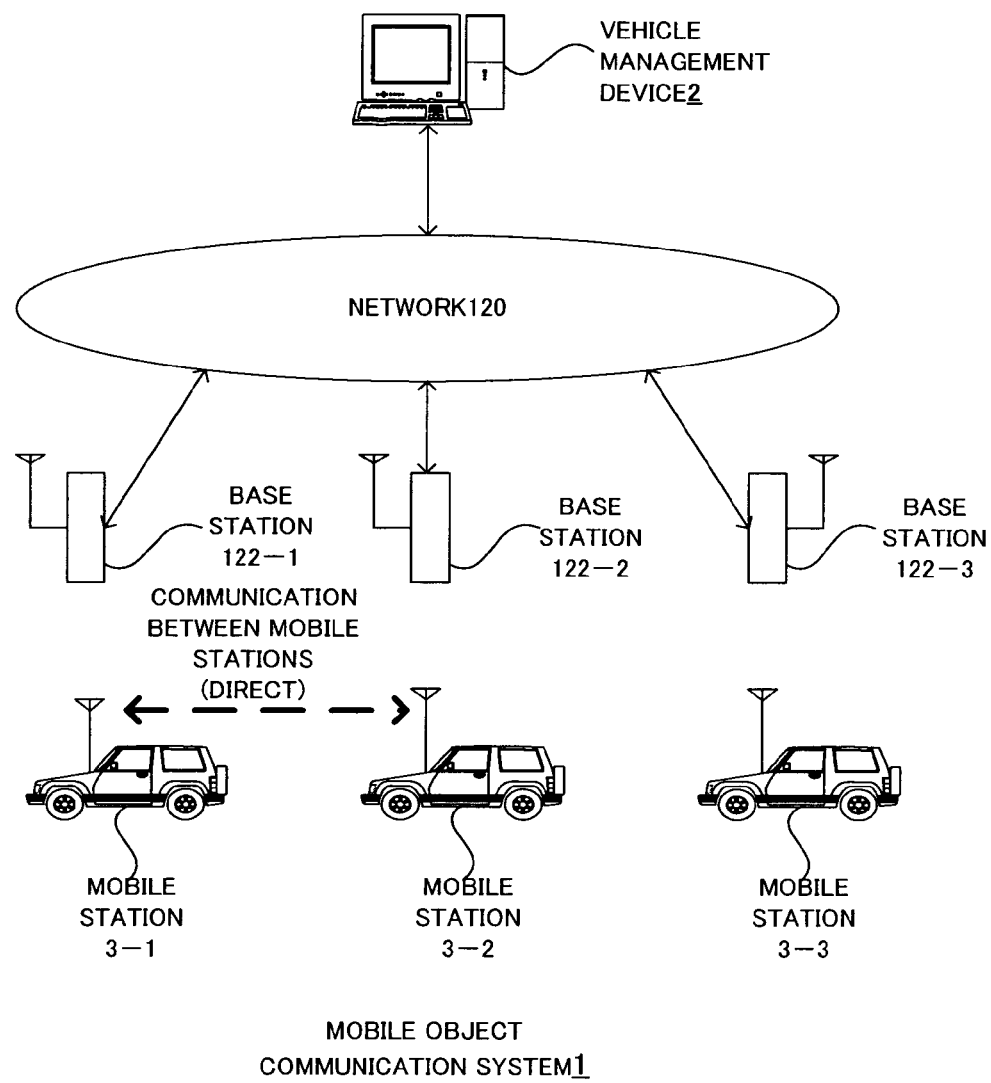
FIG. 3 is a second drawing illustrating an example communication path in the mobile object communication system shown in FIG. 1.
Figure 4:
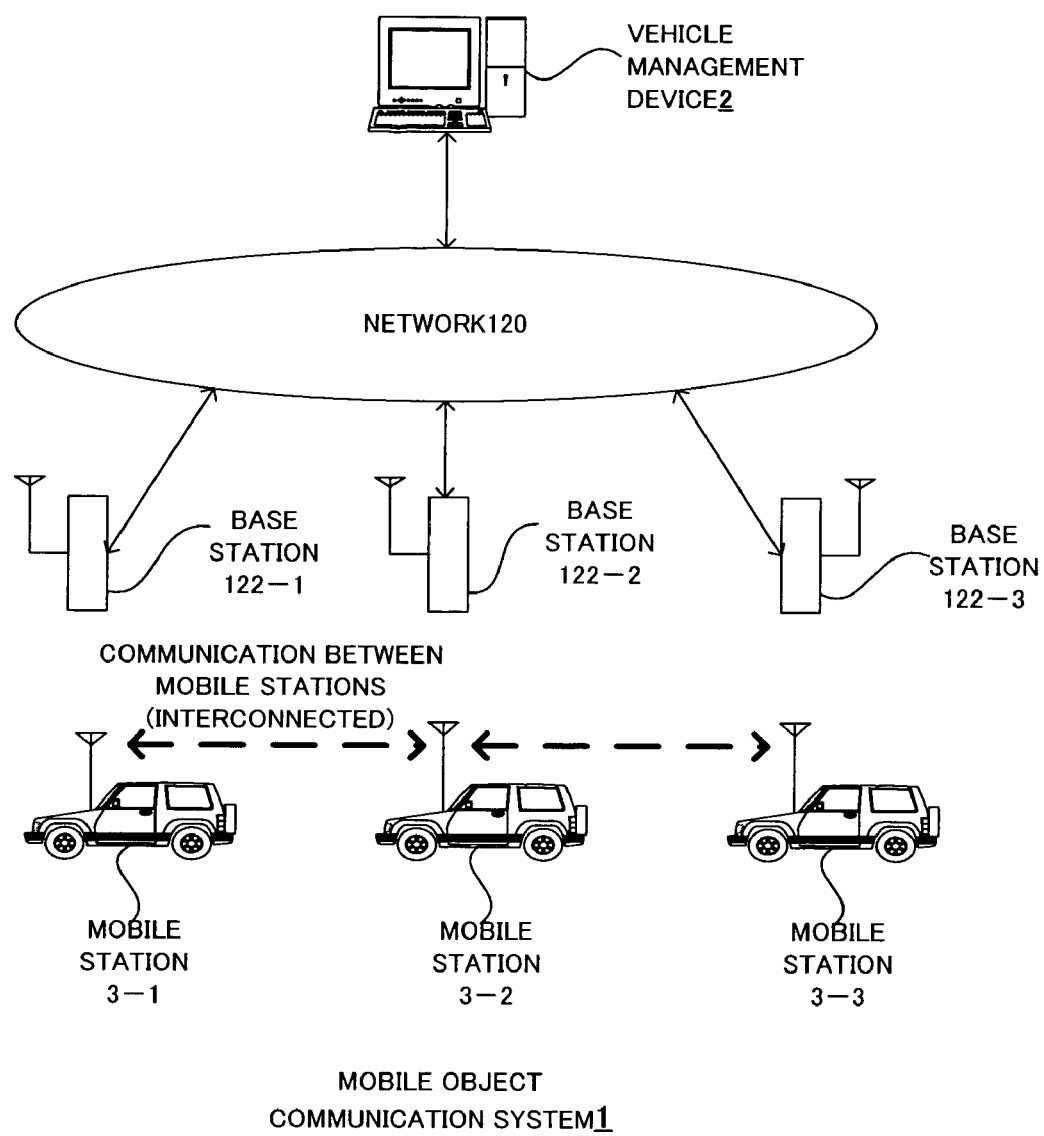
FIG. 4 is a third drawing illustrating an example communication path in the mobile object communication system shown in FIG. 1.
Figure 11:
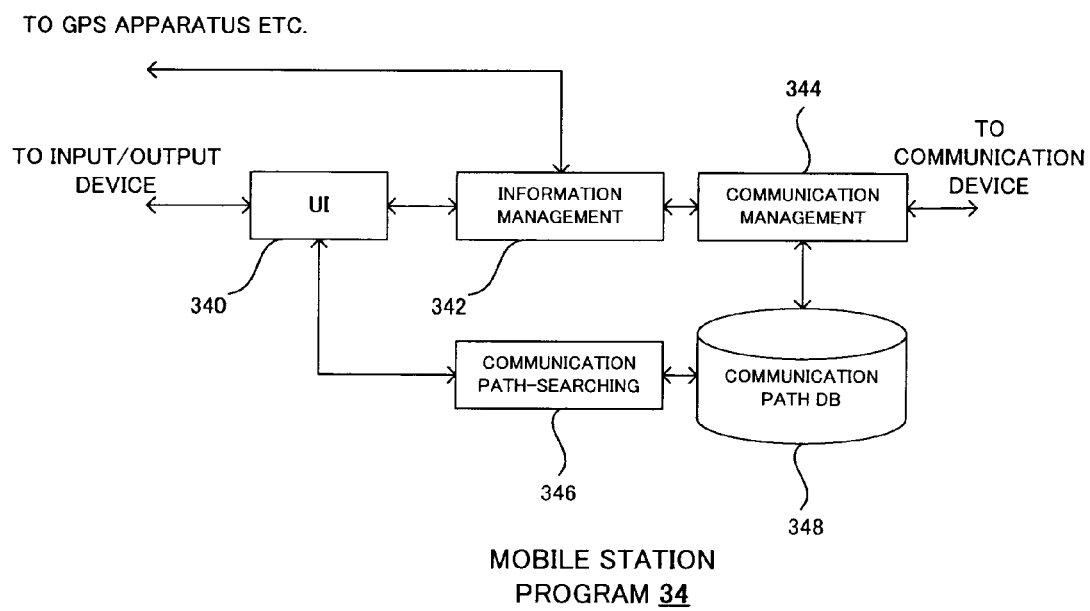
FIG. 11 illustrates an example configuration of the mobile station program executed by the vehicle-mountable wireless access point shown in FIG. 6.

FIG. 11 illustrates an example configuration of the mobile station program 34 executed by the vehicle-mountable wireless access point 304 shown in FIG. 6. As shown in FIG. 11, the mobile station program 34 is configured of a UI section 340, an information management section 342, a communication control section 344, a communication path-searching section 346 and a communication path DB 348. The mobile station program 34 is also supplied to the vehicle-mountable wireless access point 304 via, for instance, the recording medium 114 (FIG. 7), and loaded into the memory 104 to be executed. As already state, the mobile station program 34, with these constituent parts, performs searching for a communication path, as shown in FIG. 3 and FIG. 4, and other actions.

In the mobile station program 34, the UI section 340 accepts the user's operations on the input/output device 106 (FIG. 7), and controls processing by each constituent part of the mobile station program 34. The information management section 342 receives various items of information via the meter management device 306 and the tachometer 310 among others, manages them, and transmits various items of information to the vehicle management device 2 as requested. The communication control section 344, at the user's request, displays the items of information received from the meter management device 306 and the tachometer 310.

Figure 12:
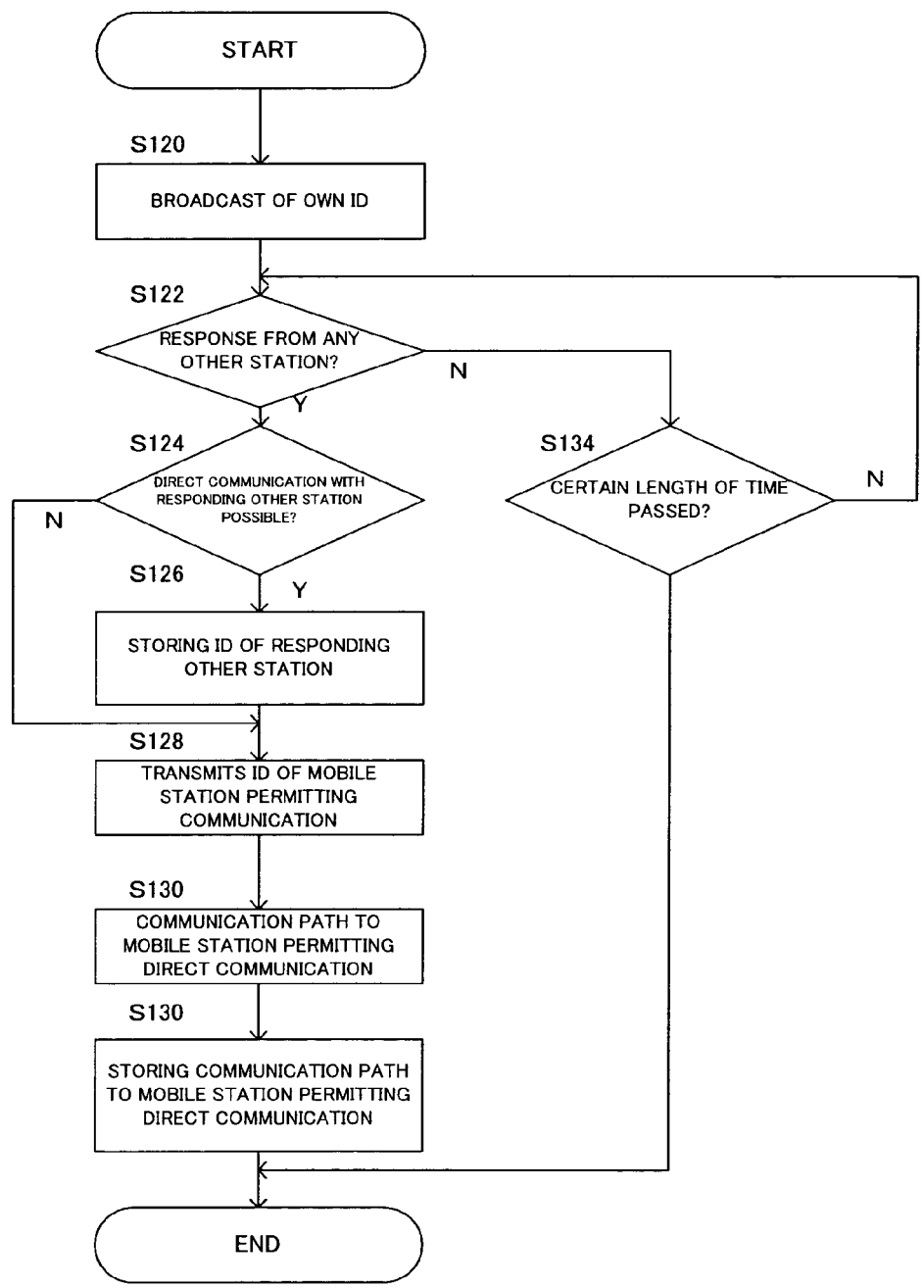
FIG. 12 is a flowchart showing the communication path search processing (S12) by the communication path-searching section shown in FIG. 11.

FIG. 12 is a flowchart showing the communication path search processing (S12) by the communication path-searching section 346 shown in FIG. 11. The communication path-searching section 346 searches for a communication path to each of the other mobile stations 3, and stores the found communication paths in the communication path DB 348.

The communication path search processing by the communication path-searching section 346 is further described with reference to FIG. 12. For instance, the communication path-searching section 346 actuates this communication path search processing of prescribed intervals of time, as does the communication path-searching section 208. As show in FIG. 12, at step 120 (S120), the communication path-searching section 346 transmits to other mobile stations 3 its own identifier (own station ID) on a broadcast basis. This broadcast transmission, unlike the broadcast transmission by the vehicle management device 2, is accomplished via communication paths for direction connection of mobile stations 3 with no intervention by the base stations 122, the network 120 or any other mobile station 3.

At step 122 (S122), the communication path-searching section 346 determines whether there has been a response from any one of the other mobile stations 3. The communication path-searching section 346 proceeds with the processing of S124 it there has been a response from any mobile station 3 or, if not, to the processing of S134.

At step 124 (S124), the communication path-searching section 346 determines whether direct communication is possible with the responding mobile station 3 as shown in FIG. 3 without intervention by another mobile station 3. The communication path-searching section 346 proceeds with the processing of S126 if it finds direct communication possible or, if not, to the processing of S128.

At step 126 (S126), the communication path-searching section 346 stores the identifier of the responding mobile station 3 (another station's ID) in the communication path DB 348 as representing a mobile station 3 with which direct communication is possible. At step 128 (S128), the communication path-searching section 346 transmits the identifier of the other mobile station 3 with which its own station can directly communicate to the responding mobile station 3.

At step 130 (S130), the responding mobile station 3 notifies the mobile station 3 to which broadcast transmission was performed in the processing of S120 (itself) of the identifiers of other mobile stations 3 with which the responding mobile station 3 can have direct communication or interconnected communication (FIG. 3 and FIG. 4). At step 132 (S132), the communication path-searching section 346 stores in the communication path DB 348 the identifiers of the other mobile stations 3 received from the responding mobile station 3 as the identifiers of the mobile stations 3 with which interconnected communication is possible via the responding mobile station 3. The communication path-searching section 346, too, may limit the number of communication paths according to the number of communication nodes intervening on the communication paths and select the shortest communication path in the processing of S132 as does the communication path-searching section 208 of the vehicle management program 20 (FIG. 8).

At step 134 (S134), the communication path-searching section 346, after transmitting on a broadcast basis the identifier of its own station to other mobile stations 3 by the processing of S120, determines whether or not a certain length of time has passed. The communication path-searching section 346, if it finds that the length of time has passed, completes processing or, if not, returns to the processing of S120.

Figure 13:
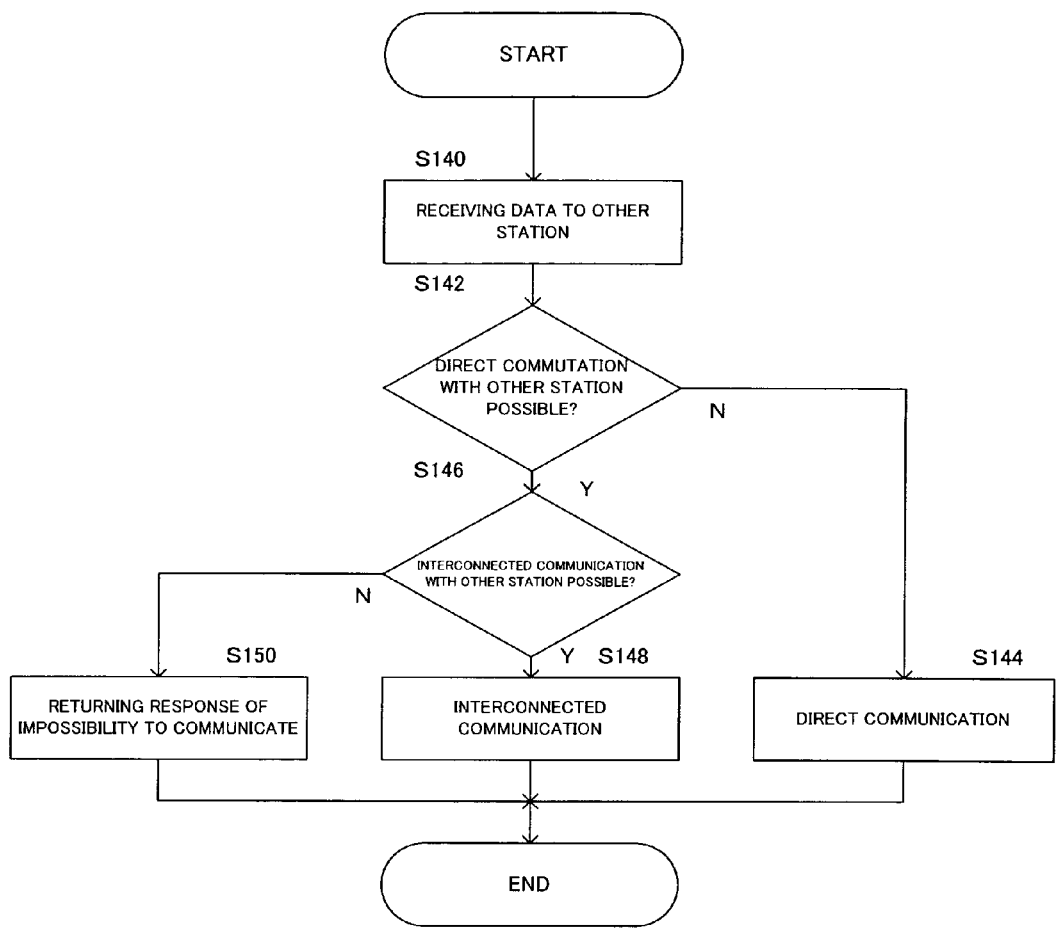
FIG. 13 is a flowchart showing the data transmission processing (S14) on other communication nodes by the communication control section of the mobile station program shown in FIG. 11.
Figure 14:
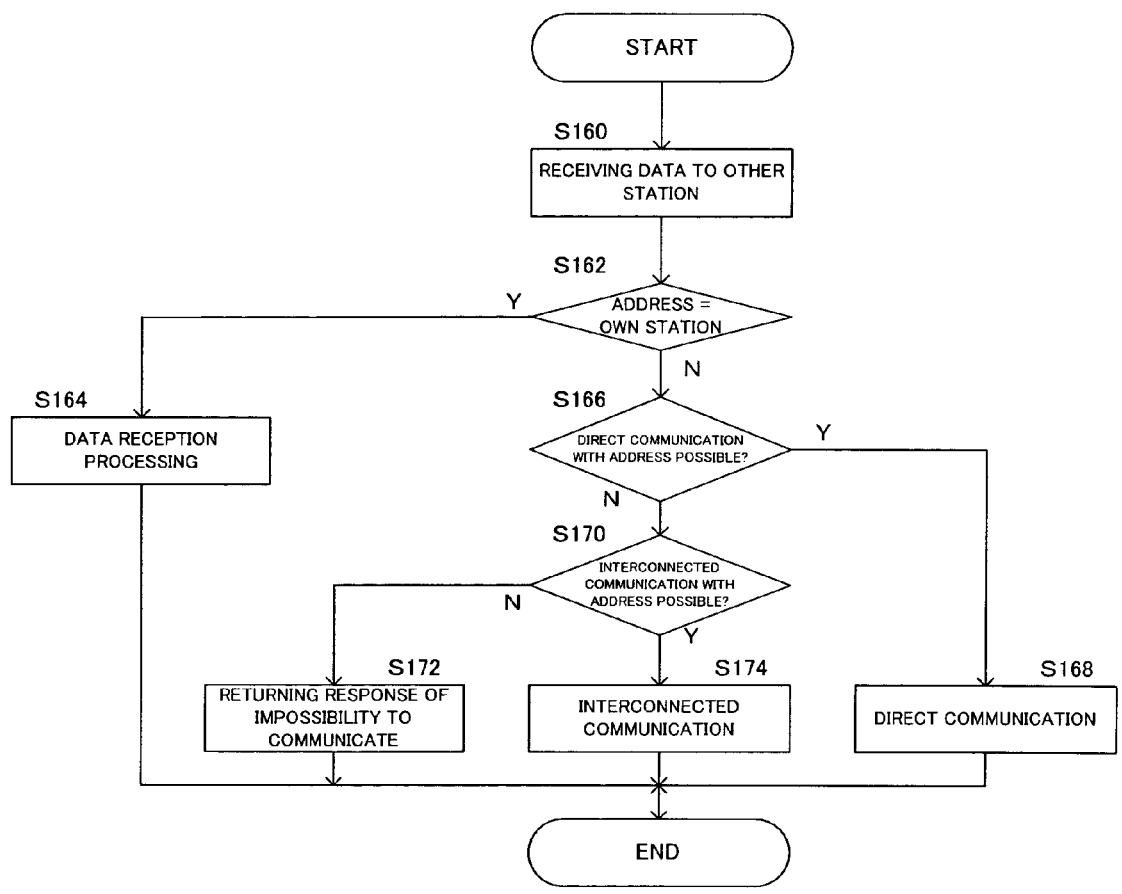
FIG. 14 is a flowchart showing the reception/interconnection processing (S14) on data from other communication nodes by the communication control section of the mobile station program shown in FIG. 11.

FIG. 13 is a flowchart showing the data transmission processing (S14) on other communication nodes by the communication control section 344 of the mobile station program 34 shown in FIG. 11. FIG. 14 is a flowchart showing the reception/interconnection processing (S14) on data from other communication nodes by the communication control section 344 of the mobile station program 34 shown in FIG. 11. The communication control section 344, following the communication paths stored in the communication path DB 348, carries out necessary controls for communication between the vehicle management device 2 and other mobile stations 3 (communication nodes).

The communication control by the communication control section 344 is described below in further detail with reference to FIG. 13 and FIG. 14. Processing of data transmission to other communication nodes is described first. As shown in FIG. 13, at step 140 (S140), the communication control section 344 receives data to be transmitted to other communication nodes from the PC-IF 314 (FIG. 6), the audio processing apparatus 320, the information management section 342 (FIG. 11) or the like.

At step 142 (S142), the communication control section 344, referencing the communication path DB 348, determines whether direct communication is possible with communication nodes to which the data are to be transmitted without the intervention of any other mobile station 3. The communication control section 344 proceeds with the processing of S144 if it finds direct communication possible or, if not, to the processing of S146.

At step 144 (S144), the communication control section 344 directly communicates with the mobile station 3 for which its transmission is destined, and transmits to it the data received in the processing of S140. Incidentally at this time, the communication control section 344 stores the identifiers of the communication nodes, which are the destinations of transmission as the transmission destination IDs and addressee ID of the data format shown in FIG. 10, stores the identifier of its own station as the transmission source ID, stores a command indicating data transmission to a mobile station 3, which is its communication partner, as the signal type, and stores data to be transmitted to the communication partner as data per se.

At step 146 (S146), the communication control section 344 determines whether interconnected communication with the node of the communication partner is possible via another mobile station 3. The communication control section 344 proceeds with the processing of S148 if the interconnected communication is possible or, if not, with the processing of S150.

At step 148 (S148), the communication control section 344 carries out interconnected communication with the node of the communication partner. Incidentally at this time, the communication control section 344 stores, as the transmission destination ID of the data format shown in FIG. 10, the identifier of another mobile station 3 with which its own station can directly communicate and which intervenes on the communication path to the communication node, which is the transmission destination, stores as the addressee ID the identifier of the mobile station 3, which is the transmission destination of data, stores as the transmission source ID the identifier of its own station, stores as the signal type a command indicating data transmission to the communication node as the transmission destination of data, and stores as data per se the data to be transmitted to the communication partner. At step 150 (S150), the communication control section 344 responds by indicating that it is not possible to communicate with other constituent parts and the like to which data were supplied in the processing of S140.

Reception/interconnection processing for data from another node is described next. As shown in FIG. 14, at step 160 (S160), the communication control section 344 receives data from another communication node (FIG. 10). At step 162 (S162), the communication control section 344 determines whether the identifier stored in the addressee ID segment in the data format (FIG. 10) is the identifier of its own station. The communication control section 344 proceeds with the processing of S164 if the identifier stored in the addressee ID segment is the identifier of its own station or, if not, with the processing of S166.

At step 164 (S164), the communication control section 344 supplies the received to the information management section 342 and the like to cause prescribed data reception processing to be performed. At step 166 (S166), the communication control section 344, referencing the communication path DB 348, determines whether the identifier of another communication node stored in the addressee ID of the data format shown in FIG. 10 is that of a communication node with which its own station can directly communicate. The communication control section 344 proceeds with the processing of S168 if the identifier of that other communication node stored as an addressee ID represents a communication node with which its own station can directly communicate or, if it does not, to the processing of S170.

At step 168 (S168), the communication control section 344 directly communicates with the other communication node represented by the addressee ID, and transmits data received in processing of S120. Incidentally at this time, the communication control section 344 stores as the transmission destination ID and addressee ID in the data format shown in FIG. 10 the identifier of the communication node, which is the communication partner, stores as the transmission source ID the identifier of its own station, stores as the signal type a command indicating data transmission to the communication node, which is the communication partner, and stores as data per se the data to be transmitted to the destination of data transmission.

At step 170 (S170), the communication control section 344, referencing the communication path DB 348, determines whether the identifier of the other communication node stored as an addressee ID in the data format shown in FIG. 10 indicates availability for interconnected communication with its own station. The communication control section 344 proceeds with the processing of S174 if the identifier of the other communication node stored as an addressee ID represents a communication node available for interconnected communication with its own station or, if it is not, to the processing of S172.

At step 172 (S172), the communication control section 344 returns responds by indicating that it is not possible to communicate with the communication node having sent data in the processing of S160. At step 174 (S174), the communication control section 344 interconnects the data received data in the processing of S160 (FIG. 10) to the communication node indicated by the addressee ID. Incidentally at this time, the communication control section 344 stores, as the transmission destination ID of the data format shown in FIG. 10, the identifier of the other communication node with which its own station can directly communicate and which intervenes on the communication path to the communication node, which is the transmission destination, stores as an addressee ID the identifier of the communication node which is the destination of data transmission, stores as the transmission source ID the identifier of its own station, stores as the signal type a command indicating data transmission to the communication node, which is the transmission destination, and stores as data per se the data to be transmitted to the destination of data transmission.

[Overall Operation]

Figure 15:
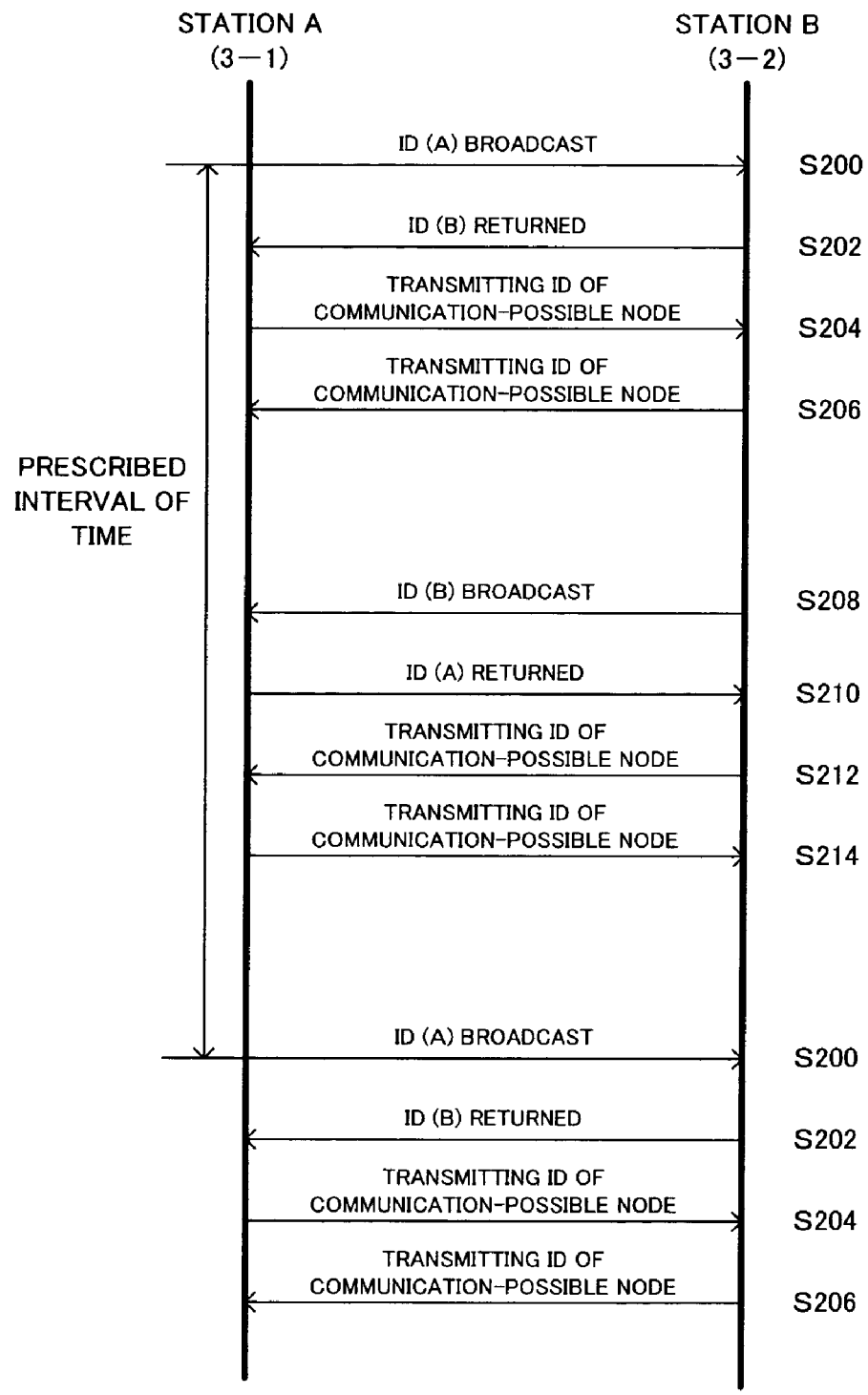
FIG. 15 shows a communication sequence of the communication path search processing (S20) by the mobile station shown in FIG. 1 and elsewhere.

The overall operation of the mobile object communication system 1 is described below. The process of searching for a communication path by a mobile station 3 with reference to FIG. 15 is described first. FIG. 15 shows a communication sequence of the communication path search processing (S20) by the mobile station 3 shown in FIG. 1 and elsewhere. As shown in FIG. 15, at step 200 (S200), Station A (mobile station 3-1) transmits its own identifier (A) to another mobile station 3 on a broadcast basis. Of other mobile stations 3, for instance, Station B (mobile station 3-2) receives the identifier of Station A (mobile station 3-1).

At step 202 (S202), Station B (mobile station 3-2) returns a response including its own identifier (B) to Station A (mobile station 3-1). At step 204 (S204), Station A (mobile station 3-1) notifies Station B (mobile station 3-2) of the identifiers of communication nodes with which it can communicate. At step 206 (S206), Station B (mobile station 3-2) notifies Station A (mobile station 3-1) of the identifiers of communication nodes it can communicate with. Through these steps of processing, Stations A and B (mobile station 3-1 and 3-2) exchange information on communication nodes with which both of them can communicate with in search of a communication path as shown in FIG. 12. The relative timings of processing at these steps S204 and S206 may vary with given conditions.

Furthermore, at step 208 (S208), Station B (mobile station 3-2) transmits its own identifier (B) to another mobile station 3 on a broadcast basis. Of other mobile stations 3, for instance Station A (mobile station 3-1) receives the identifier of Station B (mobile station 3-2).

At step 210 (S210), Station A (mobile station 3-1) returns a response including its own identifier (A) to Station B (mobile station 3-2). At step 212 (S212), Station B (mobile station 3-2) notifies Station A (mobile station 3-1) of the identifiers of communication nodes with which it can communicate. At step 214 (S214), Station A (mobile station 3-1) notifies Station B (mobile station 3-2) of the identifiers of communication nodes with which it can communicate. In this manner, Station B (mobile station 3-2) also performs communication path search processing similar to that by Station A (mobile station 3-1). The processing of the above-described steps S200 through S206 and steps S208 through S214 are repeated at prescribed intervals of time.

Figure 16:
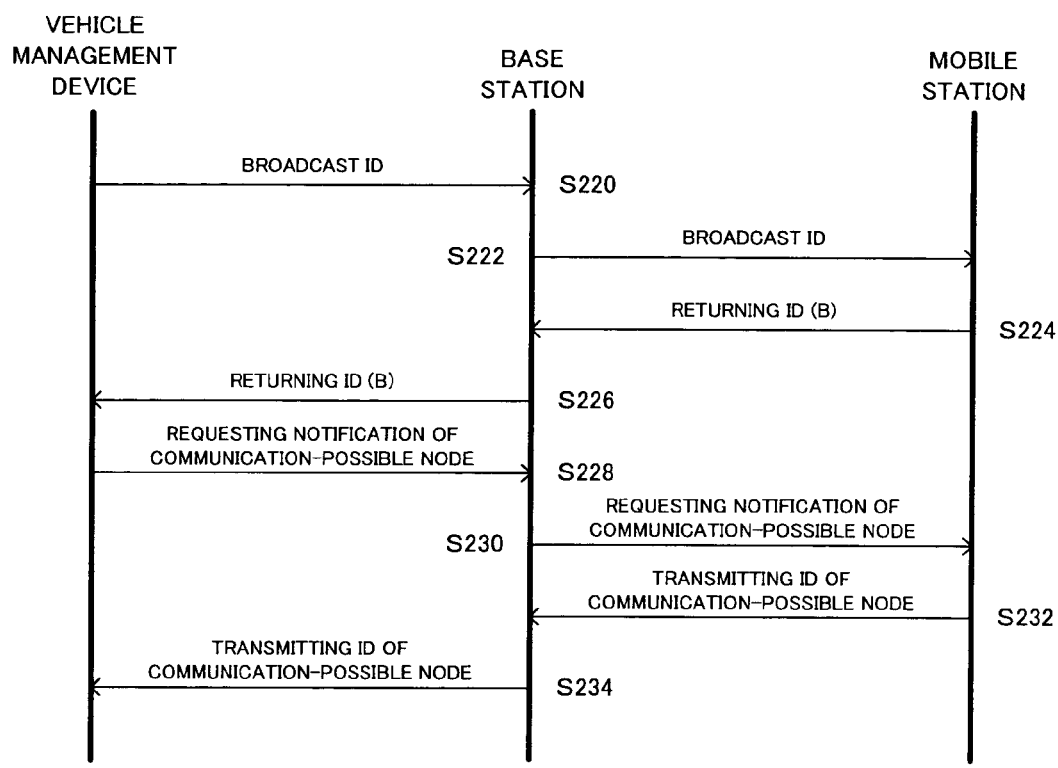
FIG. 16 shows a communication sequence of the communication path search processing (S22) by the vehicle management device shown in FIG. 1 and elsewhere.

The process of searching for a communication path by a mobile station 3 is described next with reference to FIG. 16. FIG. 16 shows a communication sequence of the communication path search processing (S22) by the vehicle management device 2 shown in FIG. 1 and elsewhere. As shown in FIG. 16, at steps 220 and 220 (S220 and S222), the vehicle management device 2 transmits its identifier on a broadcast basis to a mobile station 3 via the network 120 and the base stations 122.

At steps 224 and 226 (S224 and 226), the mobile station 3 having received the identifier from the vehicle management device 2 on a broadcast basis, returns its own identifier to the vehicle management device 2. At steps 228 and 230 (S228 and S230), the vehicle management device 2 requests the mobile station 3 to give a notification of other mobile stations 3 with which it can directly communicate.

At steps 232 and 234 (S232 and S234), the first mentioned mobile station 3 notifies the vehicle management device 2 of the identifiers of other mobile stations 3 with which it can directly communicate. Upon receipt of this notification, the vehicle management device 2 searches for a communication path to a mobile station 3 with which it can communicate as shown in FIG. 9.

Figure 17:
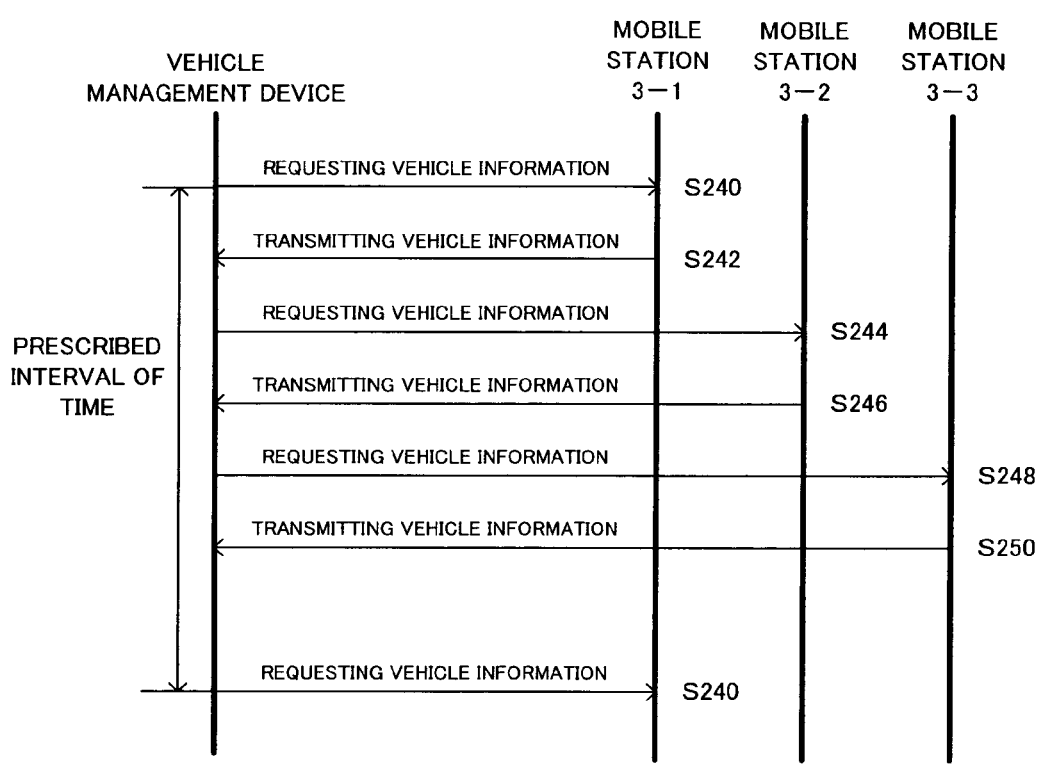
FIG. 17 shows processing to collect various information (vehicle information) (S24) on mobile stations by the vehicle management device shown in FIG. 1 and elsewhere.

The process of collection of vehicle information by the vehicle management device 2 is described next with reference to FIG. 17. FIG. 17 shows processing to collect various information (vehicle information) (S24) on mobile stations by the vehicle management device 2 shown in FIG. 1 and elsewhere. As shown in FIG. 17, at step 240 (S240), the vehicle management device 2 requests the mobile station 3-1 to transmit via access points (base stations 3) and the like various items of information (vehicle information). At step 242 (S242), the mobile station 3-1 returns vehicle information to the vehicle management device 2 via the access points (base stations 3) and the like. The vehicle management device 2 stores and manages the vehicle information returned from the mobile station 3-1.

Furthermore, as indicated by S244 through S250, the above-described requests from the vehicle management device 2 to each mobile station 3 for vehicle information and transmission of vehicle information from each mobile station 3 to the vehicle management device 2 are executed in succession. Furthermore, the above-described transmission and reception of vehicle information between each mobile station 3 and the vehicle management device 2 are repeated at prescribed intervals of time. Incidentally, while FIG. 17 illustrates an example in which direct communication takes place between the vehicle management device 2 and mobile stations 3, similar collection of information is also possible where interconnected communication takes place between the vehicle management device 2 and the mobile stations 3.

As hitherto described, by the communication system according to the present invention and the method therefor, the optimal communication path can be always searched for and found between a plurality of communication nodes and communication accomplished over the path. Also, by the communication system according to invention and the method therefor, not only is it possible to accomplish direct communication between mobile objects, but also such communication can be interconnected by another mobile object. Further by the communication system according to the invention and the method therefor, not only is it possible to accomplish direct communication between a mobile object and a network but also such communication can be interconnected by another mobile object. Also, by the information collecting apparatus according to the invention and the method therefor, the optimal communication path can always be searched for and found between a plurality of communication nodes and information collected over the path.

What is claimed is:

1. A communication device for communication by one communication device with other communication devices wherein each of the plurality of communication devices has: communication device notifying means for notifying each of the communication devices, which are informed of an identifier, of communication devices with which a particular one of the plurality of communication devices can communicate, communication path-searching means for searching for a communication path to and from communication devices with which the particular communication device can communicate on the basis of the notified communication devices, and communicating means for carrying out, on the basis of the communication path acquired as a result of the search, communication with another communication device; wherein one or more of the plurality of communication devices are vehicle-mountable wireless access points; wherein each of the communication devices bears an intrinsic identifier, and each of the plurality of communication devices further has identifier informing means for informing each of the other communication devices of its own identifier, the communication device notifying means notify the identifier of the particular communication device and the identifiers of the communication devices with which it can communicate to each of the communication devices informed of the identifier, the communication path-searching means search, on the basis of the informed identifier, for a communication path between the particular communication device and the communication devices with which the particular communication device can communicate, the communicating means have receiver means for receiving from the other communication devices communication data including the identifiers of the communication devices which are their communication partners, communication data processing means for processing the received communication data if the identifier contained in the received communication data is the identifier of the particular communication device, and communication data interconnecting means for interconnecting, on the basis of the communication path, the received communication data to the communication device which is the communication partner or to a communication device intervening between the communication partner and the particular communication device if the identifier contained in the received communication data is not the identifier of the particular communication device.

2. The information collecting apparatus according to claim 1, wherein the communication path-searching means search for a communication path which, as the communication path, links the communication nodes with which a given node can communicate with the particular node via the communication nodes.

3. The information collecting apparatus according to claim 1, wherein the information collecting apparatus and each of the communication nodes respectively bear intrinsic identifiers, the information collecting apparatus further has identifier informing means for informing each of the other communication nodes of its own identifier, and each of the communication nodes notifies communication nodes with which it can communicate to the information collecting apparatus or any of the communication nodes informed of the identifier, searches for a communication path, on the basis of the notified communication nodes, between the communication nodes with which it can communicate and itself, and carries out communication with the other communication devices on the basis of the communication path acquired as a result of the search.

* * * * *